United States Patent
Wildner

[15] 3,638,862
[45] Feb. 1, 1972

[54] THRUST NOZZLE OF TURBOJET ENGINES

[72] Inventor: Walter Wildner, Munich, Germany
[73] Assignee: Motoren-Und Turbinen-Union Muenchen GmbH, Munich, Germany
[22] Filed: July 17, 1970
[21] Appl. No.: 55,702

[30] Foreign Application Priority Data
July 19, 1969 Germany..................P 19 36 800.4

[52] U.S. Cl...................................................239/265.39
[51] Int. Cl.................................................B64c 15/06
[58] Field of Search..................239/265.19, 265.33, 265.37, 239/265.39, 455, 265.41

[56] References Cited

UNITED STATES PATENTS 2,932,161 4/1960 Geary et al. ......................239/265.39
2,974,477 3/1961 Egbert et al....................239/265.39 X

*Primary Examiner*—M. Henson Wood, Jr.
*Assistant Examiner*—Edwin D. Grant
*Attorney*—Craig, Antonelli and Hill

[57] ABSTRACT

A thrust nozzle at a tapering fuselage or nacelle tail section of an aircraft which is located downstream and adjoins an afterburner tailpipe of a turbojet engine, the exhaust gas discharge cross section of the nozzle can be adjusted by means of nozzle flaps which are pivotal about axes disposed transversely to the flow direction of the engine exhaust gases; the flaps are adapted to be actuated by an axially displaceable shroud which includes one or more tapering sections adapted to be extended out of the engine cowling for increasing the exhaust gas discharge cross section, to engage in recesses provided in the nozzle flaps.

14 Claims, 3 Drawing Figures

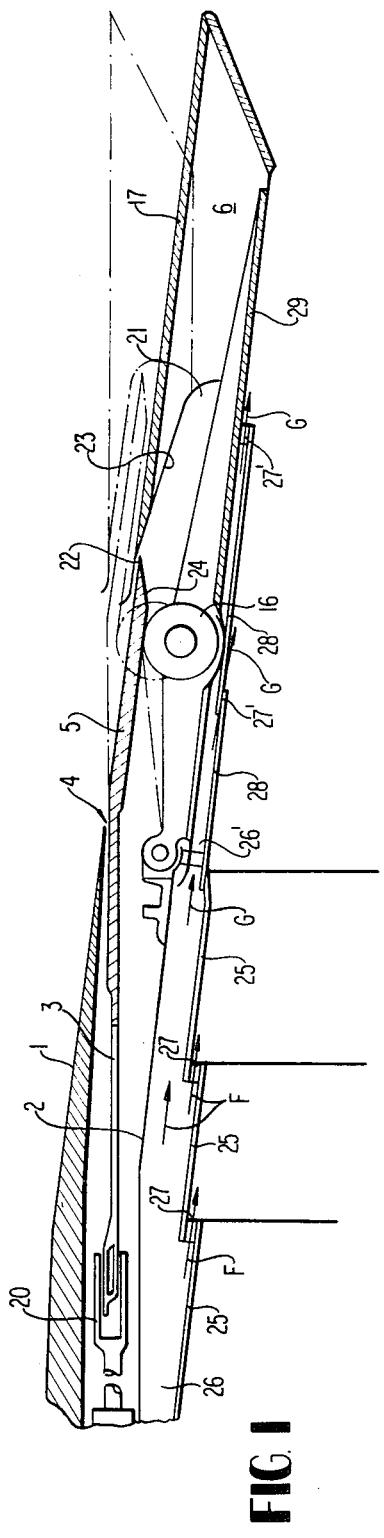
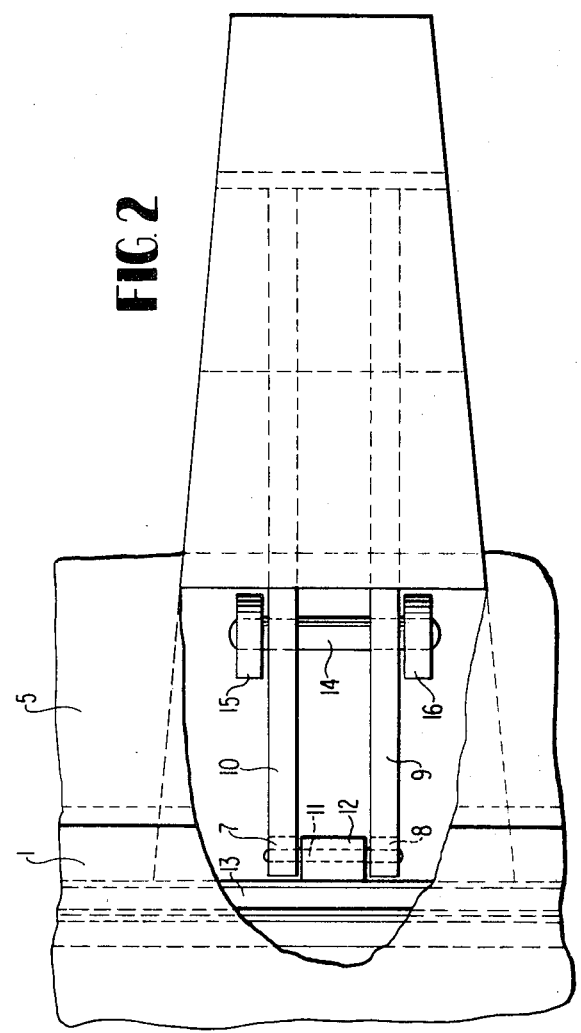

THRUST NOZZLE OF TURBOJET ENGINES

This invention relates to a final or thrust nozzle arranged at a uniformly tapering fuselage or nacelle tail section of an aircraft and mounted downstream of the afterburner tailpipe of a turbojet engine, whose exhaust gas area is adjustable or variable by means of nozzle flaps rotatable about axes which are located substantially transversely to the flow direction of the engine exhaust gases, whereby these flaps are to be actuated by way of a translating, axially displaceable nozzle-actuating shroud.

With known thrust nozzles of this type, as used for aircrafts equipped with turbojet engines, it has been found that—especially with the minimum exhaust gas area and resulting maximum end position of the nozzle flaps extending into the exhaust stream of the engine—these flaps produce relatively abrupt, so-called kinks within the region of their pivot axes, which leads to a separation of the flow of the outside air passing along the aircraft fuselage or nacelle tail section, so that the outside air merges with the engine exhaust gases only downstream of the thrust nozzle, under the influence and with the formation of strong vortices or eddies.

This vortex formation leads to a so-called "dead water area" (wake), as termed in technical fluid dynamics, which results in considerable flow losses of the outside air passing along the aircraft tail section and eventually in an increased drag of the aircraft, which in turn would have to be compensated for by an increased power level of the engine. These flow losses, which are caused by the so-called "dead water region" (wake), are of special disadvantage if one considers that, with an aircraft equipped with an engine afterburner system, the cruise flight has to take place as a rule with the exhaust gas area at its minimum cross section for continuous flight operation in the subsonic region with the afterburner shutdown; as a rule, an aircraft equipped with a known nozzle arrangement of the type described above would thus be subject to these flow losses.

Due to the high fuel consumption, the afterburner is turned on only for a short period in order to increase the thrust; likewise, due to the resulting volume increase of the engine exhaust gases, the thrust nozzle is also opened up only momentarily, whereby the similarly momentary pivoting of the nozzle flaps out of the exhaust gas stream connected therewith may also cause a short-term reduction of the flow losses in the region of the thrust nozzle for this temporary flight condition only.

Furthermore, for turbojet engines equipped with afterburner and variable nozzle area it was previously proposed to arrange the nozzle flaps used for increasing or decreasing the exhaust gas area in such a manner that they could alternatively be moved into or out of an aircraft fuselage tail section featuring a uniform taper.

Admittedly this proposed arrangement will ensure that all nozzle flaps constitute a continuation of the fuselage tail section of constant taper, when they have reached the end position for the smallest exhaust gas area, without causing any substantial flow losses.

However, this proposed nozzle requires a large amount of constructive manufacturing expenditures due to the necessity of extending and retracting the nozzle flaps into the fuselage tail section and out of this tail section, respectively required by this solution, which is caused by the fact that for moving the flaps into and out of the tail section, a great number of outriggers or brackets are required, which are connected with the nozzle flaps and require a considerable, additional space within the fuselage tail section of the aircraft.

It is the purpose of this invention to eliminate the disadvantages associated with these types of final or thrust nozzles used for aircraft engines with afterburners, and to provide a nozzle which only causes negligible flow losses to the outside air passing along the aircraft or nacelle tail section, particularly, when the exhaust gas area is at its minimum, i.e., when the nozzle flaps are pivoted into the gas stream as far as required, and which furthermore, notwithstanding these requirements, is to require only a minimum number of actuating elements and components, whereby it will be assured that only relatively low manufacturing expenditures would be required, on the one hand, for this thrust nozzle and its operating mechanisms for actuating the flaps as well as a relatively small space would be required, on the other, to accommodate the same within the tail section of an aircraft fuselage or nacelle. Furthermore, this nozzle should be capable of being operated in a relatively easy manner and of ensuring an optimum operating reliability, despite the high temperature effects caused by the engagement of the turbojet afterburner in case of its required operation.

As solution to the underlying problem, it is proposed by this invention in connection with a thrust nozzle of the type described above, that one or several tapered sections of the nozzle-actuating shroud should be so designed that they can be retracted into recesses of the nozzle flaps in order to increase the exhaust gas area of the thrust nozzle, with these sections located downstream of the fuselage or nacelle tail section and substantially following the fuselage or nacelle contour and adapted to be moved out of the engine cowling associated with the fuselage or nacelle tail section, whereby the pivot bearings of the nozzle flaps are located within the engine cowling as well as within the nozzle-actuating shroud.

With the thrust nozzle as proposed by the present invention, it is of special advantage that the downstream section or sections of the nozzle-actuating shroud as well as the adjoining nozzle flaps always form a unit, together with the fuselage or nacelle tail section, that is free of any flow obstructions whenever the nozzle has reached its final end positions, thus ensuring that the outside air is permitted to pass along freely and that the exhaust gases can pass through the thrust nozzle in a satisfactory manner.

This is of special significance in the case of the smallest exhaust gas area of the nozzle, that would have to be selected for continuous cruise flight operation of the aircraft; in this case, the downstream end of the nozzle-actuating shroud and the nozzle flaps will constitute a continuation of constant taper of the fuselage or nacelle tail section.

The exhaust gas area which is increased when the afterburner is turned on, causes only a slight change or correction to the outside air passing along the fuselage or nacelle tail section as well as along the thrust nozzle due to the slight extension of the nozzle flaps so that no significant losses of the outside air can occur, all the more, since even in this position of the nozzle, no edges of the nozzle-actuating flaps would project into the outside airstream causing the formation of vortices.

When there are several nozzle flaps one after the other in a circumferential direction of the thrust nozzle, it will thus be possible to move the flaps simultaneously out of the exhaust gas stream of the engine by the same angular value in order to increase the exhaust gas area.

In this case, the individual nozzle flaps may be arranged in such a manner that they form a fully closed flap unit, during the actuating phase as well as in all specified nozzle end positions, by shifting the flaps one into the other or one on top of the other.

Alternatively, the individual nozzle flaps may also be arranged in such a manner that they only form a fully closed flap unit, for example, in the position of the smallest exhaust gas area of the thrust nozzle, while in the position of the fully opened exhaust gas area of the thrust nozzle they would leave wedge-type spaces between one another that would permit the outside air to be drawn in by the engine exhaust gases and admixed thereto. For instance, in this manner it would also be possible to reduce the high temperature occurring at the inner surfaces of the nozzle flaps when they are fully opened and when the afterburner is turned on.

Furthermore, this invention also permits the application of so-called sealing flaps, which could be arranged alternately between two adjacent nozzle flaps. In this case, the sealing flaps would be simultaneously actuated with the nozzle flaps.

This means that with a nozzle according to this invention, not all but, for example, only every second successive flap would have to be equipped with recesses for retracting the nozzle-actuating shroud.

In a further embodiment of this invention, in the position of the smallest gas discharge cross section, the inner sliding surfaces, associated with those sections of the nozzle-actuating shroud that are tapering in a downstream direction and that fit into the recesses of the nozzle flaps during the retraction cycle, are to be designed at a steeper angle towards the inside, as compared to the conical shape of the actuating shroud. In this manner, all nozzle flaps can easily be moved by a short and axial extending motion of the nozzle-actuating shroud out of the engine cowling associated with the fuselage or nacelle tail section into the end position required, e.g. for the largest exhaust gas area.

In a suitable construction of the present invention, the downstream sections of the actuating shroud could be so designed as to be movable over rollers supported at the nozzle flaps.

In order to ensure that the high temperatures occurring during engagement of the afterburner would not adversely affect the safe operation of the thrust nozzle, the present invention further provides to equip the inner surfaces of the nozzle flaps with heat shields, whereby these heat shields are adapted to be subjected to a cooling medium in every end position of the nozzle flaps, in continuation of both the heat shield associated with the afterburner tailpipe and the coolant duct.

These and further objects, features, and advantages of the present invention will become more obvious from the following description when taken in connection with the accompanying drawing which shows, for purposes of illustration only, some embodiments of the present invention, and wherein:

FIG. 1 is a longitudinal cross-sectional view of a nozzle flap associated with a thrust nozzle in accordance with the present invention which is arranged at a fuselage and jet pipe end, shown only in part, as well as of certain details for the nozzle flap-actuating mechanism in accordance with the present invention;

FIG. 2 is a top plan view of the nozzle flap according to FIG. 1 whereby a section broken away from the nozzle-actuating shroud and airframe fuselage tail provides a view into the interior of the nozzle flap.

Figure 3:
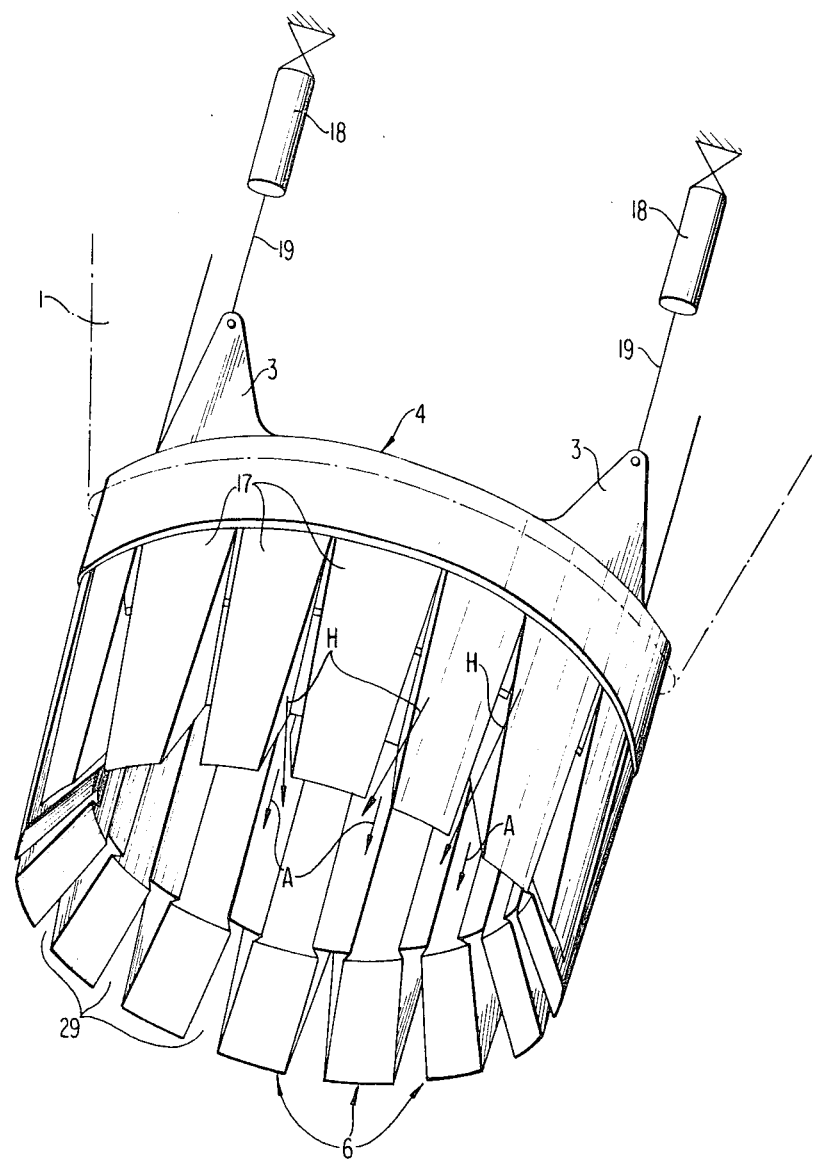
FIG. 3 is a perspective view as seen from behind and from above illustrating all nozzle flaps in the fully opened position thereof.

Referring now to the drawing wherein like reference numerals are used throughout the various views to design like parts, and more particularly to FIG. 1, the afterburner tailpipe 2, forming part of a turbojet engine not shown in detail in the accompanying drawings, in enclosed by the aircraft fuselage tail section 1 which is of a substantially uniform taper. Located between the fuselage tail section 1 and the afterburner tailpipe 2 are the arms 3 of an axially movable nozzle-actuating shroud generally designated by reference numeral 4, which extends from the fuselage tail section 1 in the form of a section 5, tapering in a downstream direction. The nozzle flaps 6 (FIG. 3) are pivotably mounted at a collar 12 with the downstream ends 7, 8 of two longitudinal links or webs 9, 10 (FIG. 2) and by means of a bolt 11; the collar 12, in turn, is secured at a sectional girder or profile bearer 13 enclosing the end of the afterburner tailpipe 2. Rollers 15, 16 are supported at each of the nozzle flaps 6 by way of a further bolt 14, passing through links or webs 9, 10.

In FIG. 1 the nozzle flap 6 is in its end position required for the minimum exhaust gas area. As can further be seen from FIG. 1, the nozzle flap 6 together with the outer surfaces 17 thereof constitutes in this position a constantly tapering continuation of the fuselage tail section 1 and of the section 5 of the nozzle-actuating shroud 4. In order to enable, for instance, with the afterburner of a turbojet engine turned on, all nozzle flaps 6 to reach the fully opened end position (FIG. 3) to increase the nozzle exhaust area, the nozzle-actuating shroud 4 is extended or moved out of the fuselage tail section 1 of the aircraft in an axial direction, supporting itself at the rollers 15 and 16, by means of hydraulically or pneumatically controlled telescopic cylinders 18 (FIG. 3), which are connected to the arms 3 of the actuating shroud 4 by way of piston rods 19 and pivot joints 20 (FIG. 1). The section 5, tapering in a downstream direction, of the nozzle-actuating shroud 4 thereby reaches and engages with a respective recess 21 provided in each nozzle flap 6; as the end 22 of the section 5 of the actuating shroud 4 passes along the inner surfaces 23 of the nozzle flaps 6, each nozzle flap 6 is simultaneously brought into the end position that is shown in dash and dotted lines, whereby in this end position of the nozzle flaps 6, the downstream section 5 of the nozzle-actuating shroud 4 engages over its entire length in the associated recesses 21 of nozzle flaps 6 (FIG. 3); the surface 24 of the section 5 of the nozzle-actuating shroud 4 thereby touches, i.e., is tangent to the webs or links 9, 10 of each nozzle flap 6.

As can further be seen from FIG. 1, the inner surfaces of the afterburner tailpipe 2 are lined with a heat shield 25, which is subjected to cooling air tapped from the compressor of a turbojet engine, not shown in the drawings, and passing through the openings 27, by way of an annular coolant duct 26 in the direction of arrows F. In order to protect the actuating mechanism of the nozzle flaps 6 as well as the flaps themselves, from the high temperatures occurring upon turning on of the afterburner, further heat shields 28 are arranged on the inner surfaces 29 of the nozzle flaps in such a manner that they form a continuation 26' of the coolant duct 26 associated with the afterburner tailpipe, whereby cooling air can also pass over the same or through the openings 27' in the direction of further arrows G.

From FIG. 3 it can also be seen that the individual nozzle flaps 6 leave wedge-shaped spaces 29' therebetween in the fully opened end position, as shown in this figure, in order to permit portions of the outside air passing along the fuselage tail section 1 of the aircraft to be drawn-in in the direction of arrows H and to be admixed to the exhaust gases discharged from the final nozzle in the direction of arrows A, in order to further decrease the wall temperature of the nozzle flaps 6 when the afterburner is turned on.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all those changes and modifications as are encompassed by the scope of the appended claims.

I claim:

1. A thrust nozzle arranged at a tapering fuselage or nacelle tail section of an aircraft and adjoining an afterburner tailpipe of a turbojet engine, the exhaust gas discharge cross section of said nozzle being adjustable by means of nozzle flap means pivotal about axes disposed substantially transversely to the flow direction of the engine exhaust gases, and which comprises flap-actuating means for actuating said flap means including an axially displaceable nozzle-actuating shroud means, characterized in that, for increasing the exhaust gas discharge cross section of the thrust nozzle, at least one tapering section of the nozzle-actuating shroud means is operable to be extended out of the engine cowling associated with the fuselage or nacelle tail section to engage downstream in recesses provided in the nozzle flap means, and the pivot bearing means for the nozzle flap means located within the engine cowling as well as within the nozzle-actuating shroud means.

2. A thrust nozzle according to claim 1, characterized in that the taper of each tapering section of the nozzle-actuating shroud means substantially follows the taper of the fuselage or nacelle tail section.

3. A thrust nozzle according to claim 2, characterized in that each section of the nozzle-actuating shroud means tapers substantially conically.

4. A thrust nozzle according to claim 3, characterized in that the fuselage or nacelle tail section tapers substantially uniformly.

5. A thrust nozzle according to claim 1, characterized in that several tapering sections of the nozzle-actuating shroud means are provided.

6. A thrust nozzle according to claim 5, characterized in that, in the position of the smallest exhaust gas discharge cross section of the thrust nozzle, the inner sliding surfaces provided on the flap means which, for the engagement of each tapering section of the shroud means, are associated with the recesses of the flap means, are inclined more strongly toward the inside in deviation from the conicity of the shroud means.

7. A thrust nozzle according to claim 6, characterized in that the downstream sections of the actuating shroud means are displaceable over rollers supported on the nozzle flap means.

8. A thrust nozzle according to claim 7, characterized in that the nozzle flap means are provided with heat shield means at their inner surfaces, which as a continuation of heat shield means associated with an afterburner tailpipe as well as of a coolant duct, are adapted to be subjected to cooling air in each end position of the nozzle flap means.

9. A thrust nozzle according to claim 8, characterized in that the taper of each tapering section of the nozzle-actuating shroud means substantially follows the taper of the fuselage or nacelle tail section.

10. A thrust nozzle according to claim 9, characterized in that each section of the nozzle-actuating shroud means tapers substantially conically.

11. A thrust nozzle according to claim 10, characterized in that the fuselage or nacelle tail section tapers substantially uniformly.

12. A thrust nozzle according to claim 1, characterized in that, in the position of the smallest exhaust gas discharge cross section of the thrust nozzle, the inner sliding surfaces provided on the flap means which, for the engagement of each tapering section of the shroud means, are associated with the recesses of the flap means, are inclined more strongly toward the inside in deviation from the conicity of the shroud means.

13. A thrust nozzle according to claim 1, characterized in that the downstream sections of the actuating shroud means are displaceable over rollers supported on the nozzle flap means.

14. A thrust nozzle according to claim 1, characterized in that the nozzle flap means are provided with heat shield means at their inner surfaces, which as a continuation of heat shield means associated with an afterburner tailpipe as well as of a coolant duct, are adapted to be subjected to cooling air in each end position of the nozzle flap means.

* * * * *